(12) United States Patent
Taaghol et al.

(10) Patent No.: US 8,565,744 B2
(45) Date of Patent: Oct. 22, 2013

(54) VERTICAL HANDOVER COMPOSITE QUALITY MEASURES

(75) Inventors: Pouya Taaghol, San Jose, CA (US); Vivek Gupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1290 days.

(21) Appl. No.: 11/591,191

(22) Filed: Oct. 31, 2006

(65) Prior Publication Data

US 2008/0101318 A1     May 1, 2008

(51) Int. Cl.
- H04M 3/00 (2006.01)
- H04M 1/00 (2006.01)
- H04W 36/00 (2009.01)
- H04B 7/00 (2006.01)

(52) U.S. Cl.
USPC ........... 455/418; 455/436; 455/445; 455/522; 455/552.1; 370/329; 370/331; 370/338; 370/466

(58) Field of Classification Search
USPC .................. 370/331, 332, 333, 329, 338, 466; 455/436, 522, 418, 445, 552.1
See application file for complete search history.

(56) References Cited

U.S. PATENT DOCUMENTS

| | | | |
|---|---|---|---|
| 5,774,785 A * | 6/1998 | Karlsson ........................ 455/522 |
| 6,940,844 B2 * | 9/2005 | Purkayastha et al. ......... 370/338 |
| 7,961,726 B2 | 6/2011 | Wang et al. |
| 2004/0076179 A1 * | 4/2004 | Kaminski et al. ............. 370/466 |
| 2004/0137901 A1 * | 7/2004 | Hamasaki et al. ............ 455/436 |
| 2005/0271011 A1 * | 12/2005 | Alemany et al. .............. 370/331 |
| 2006/0014539 A1 * | 1/2006 | Oh .................................. 455/436 |
| 2006/0039327 A1 * | 2/2006 | Samuel et al. ................. 370/331 |
| 2006/0084417 A1 * | 4/2006 | Melpignano et al. ......... 455/418 |
| 2006/0209882 A1 | 9/2006 | Han et al. |
| 2006/0221901 A1 * | 10/2006 | Yaqub et al. .................. 370/331 |
| 2006/0291417 A1 * | 12/2006 | Aust et al. ..................... 370/331 |
| 2007/0072614 A1 * | 3/2007 | Forsberg ....................... 455/436 |
| 2007/0082697 A1 * | 4/2007 | Bumiller et al. ........... 455/552.1 |
| 2007/0091844 A1 * | 4/2007 | Huang et al. .................. 370/331 |
| 2007/0160007 A1 | 7/2007 | Wang et al. |
| 2008/0031188 A1 * | 2/2008 | Magnusson et al. .......... 370/329 |
| 2008/0102843 A1 * | 5/2008 | Todd et al. .................... 455/445 |
| 2008/0254797 A1 | 10/2008 | Achtari et al. |
| 2010/0085975 A1 | 4/2010 | Wang et al. |
| 2011/0085518 A1 | 4/2011 | Taaghol et al. |

OTHER PUBLICATIONS

Pahlavan, Kaveh, et al., "Handoff in Hybrid Mobile Data Networks", University of Oulu, IEEE Personal Communications,(Apr. 2000),14pgs.

Zhang, Qian, et al., "Efficient Mobility Management for Vertical Handoff between WWAN and WLAN", IEEE Communications Magazine,(Nov. 2003),7pgs.

Office Action Received for U.S. Appl. No. 12/971,198 mailed on Aug. 18, 2011, 15 pages.

Office Action Received for U.S. Appl. No. 12/971,198 mailed on Sep. 5, 2012, 18 pages.

* cited by examiner

*Primary Examiner* — William D Cumming
(74) *Attorney, Agent, or Firm* — Forefront IP Lawgroup, PLLC

(57) ABSTRACT

A composite quality measure helps determine a target for a vertical handover between different connection types. Various measurements are normalized, weighted and summed to produce composite quality measures. A composite quality measure may be compared to a target value and the corresponding connection may be added to a feasibility table if the composite quality measure is above the target.

11 Claims, 3 Drawing Sheets

VERTICAL HANDOVER COMPOSITE QUALITY MEASURES

FIELD

The present invention relates generally to wireless communications, and more specifically to handing over wireless communications between different connection types.

BACKGROUND

Many wireless environments include heterogeneous access technologies and networks. For example, a mobile wireless device may be able to connect to a cellular base station, a wireless local area network (WLAN), a wireless wide area network (WWAN), a wireless metropolitan area network (WMAN) and others. As mobile stations move about, they may handover communications from one connection type to another connection type. For example, a mobile device may handover from a cellular base station to a wireless local area network access point. A handover between different connection types is referred to herein as a "vertical handover." This is in contrast to a "horizontal handover" in which the connection type remains the same. A horizontal handover may occur when a mobile device hands off from one cellular base station to another, or disassociates from one WLAN access point and associates with another.

Problems and challenges presented by vertical handovers are, in some cases, more difficult than those presented by horizontal handovers. Vertical handovers may involve two very different air interfaces (WLAN, WWAN, cellular) that make comparison of radio metrics (e.g. signal strength) difficult. Further, mobile devices and heterogeneous networks may not have ways to share inter-radio inter-network information such as available networks in a particular area (neighbour maps) to reduce the scan time and handover delays.

Many known handover schemes are based just on Received Signal Strength Indicator (RSSI), and in many cases handover decisions are made unilaterally by the mobile device. In multiple network environments, this approach may suffer from a high failure rate. For example, the RSSI of a WLAN access point may indicate a high received signal strength at the mobile device even in the presence of high interference thus leading to a high packet loss rate. In this scenario, the decision to handover to the WLAN access point might easily cause a connection failure (e.g., a dropped call) as the high-interfered WLAN radio would result in high packet loss rate.

DESCRIPTION OF EMBODIMENTS

Figure 1:
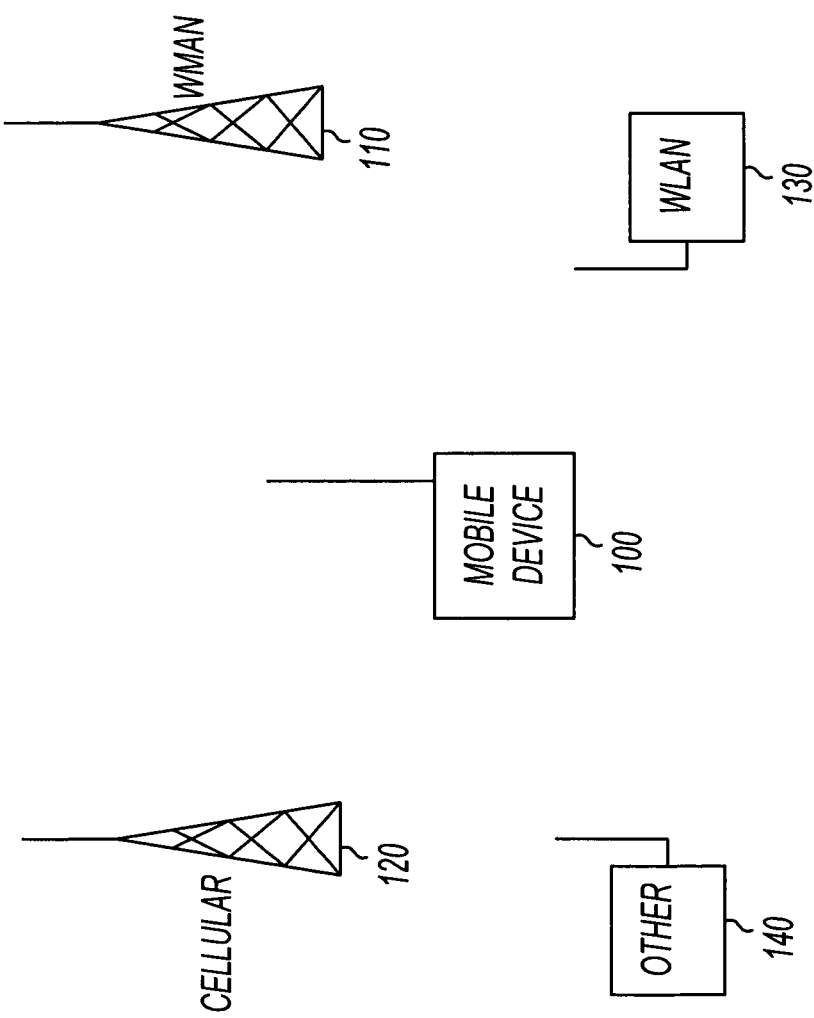
FIG. 1 shows a mobile device in a heterogeneous network environment.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is; therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mobile device in a heterogeneous network environment. Mobile device 100 is a device capable of communicating with more than one connection type. For example, mobile device 100 may be a laptop computer with a WLAN network interface card (NIC) and a WWAN NIC. Also for example, mobile device 100 may be a device capable of making voice calls using either a cellular connection or a WLAN connection. The various embodiments of the present invention are applicable to any device capable of communicating in a heterogeneous environment, and are not limited to laptops and phones.

In operation, mobile device 100 may communicate with any of cellular base station 120, WLAN access point 130, WMAN access point 110, or other connection type apparatus 140. Mobile device 100 may make a vertical handover from one connection type to another. For example, as mobile device 100 moves about, it may communicate with cellular base station 120, and then handover communications to WLAN access point 130. Handovers from any one connection type to any other connection type are possible.

Cellular base station 120 may be any type of cellular base station and may use any type of air interface. For example, cellular base station 120 may communicate using time division multiple access (TDMA), frequency division multiple access (FDMA), code division multiple access (CDMA), or any other multiple access scheme. Further, cellular base station 120 may or may not adhere to a cellular telephony standard.

WLAN access point 130 may be any type of wireless local area network access point, and may use any type of air interface. In some embodiments, WLAN access point 130 may operate partially in compliance with, or completely in compliance with, a wireless network standard. For example, WLAN access point 130 may operate partially in compliance with a standard such as IEEE Std. 802.11, 1999 Edition, (WiFi) although this is not a limitation of the present invention. As used herein, the term "802.11" refers to any past, present, or future IEEE 802.11 standard, including, but not limited to, the 1999 edition.

WMAN access point 110 may be any type of wireless wide area network access point. In some embodiments, WMAN access point 110 may operate in compliance with a wireless metropolitan area network standard such as IEEE Std. 802.16-2004, published Oct. 1, 2004, (WiMAX) although this is not a limitation of the present invention. As used herein, the term "802.16" refers to any past, present, or future IEEE 802.16 standard, or extension thereto, including, but not limited to, the 2004 edition.

Other connection type apparatus 140 represents one or more additional network access points to which mobile device 100 may communicate. Other connection type apparatus 140 may communicate using any type of air interface. Example interfaces may include, but are not limited to, personal are network interfaces such as IEEE 802.15.3 (ultra-wideband (UWB)) interfaces, and IEEE 802.15.1 (Bluetooth)

interfaces, IEEE 802.15.4 (Zigbee) and high-data rate mobile standards such as IEEE 802.20.

In heterogeneous networks like the one shown in FIG. 1, networks and network services converge to provide seamless user services to a mobile user regardless of access technology. In order to provide seamless user services, seamless vertical handovers between different radios and different connection types are needed. Various embodiments of the present invention provide a comprehensive handover mechanism in which a composite quality measure is used to evaluate the connection quality of a current connection as well as the potential connection quality of different connection types. The composite quality measure avoids the usual single-dimensional measures of a particular radio technology and enhances vertical handover success. The concept of a feasibility connection table is introduced which helps reduce the handover delay times by preparing feasible connections before handover decisions are made.

Handover algorithms may be divided into four categories based on where the handover decision is made and whether information is shared between mobile devices and networks. These four categories are: 1) Unilateral Mobile-Decided Handover (handover decision made unilaterally by mobile device); 2) Unilateral Network-Decided Handover (handover decision made unilaterally by network); 3) Mobile-Assisted Network-Decided Handover (handover decision made by network with information provided by mobile device); and 4) Network-Assisted Mobile-Decided Handover (handover decision made by mobile device with information provided by network).

The various embodiments of the present invention utilize a Network-Assisted Mobile-Decided handover (item 4 from the previous paragraph). This scheme is more capable than the others under rapidly changing radio conditions in part because the mobile device can make handover decisions while observing the changes in the radio conditions. When the network provides information to aid in the handover decision, drawbacks of unilateral mobile-decided handovers may be avoided.

Various embodiments of the present invention utilize a composite quality measure defined by addition of weighted normalized metrics:

$$Q(t) = \sum_{i=1}^{n} w_i \tilde{M}_i(t) \quad (1)$$

Where Q(t) is the calculated composite quality measure at sample time t, $w_i$ is the constant weight given to a metric, $\tilde{M}_i(t)$ is the normalized metric i at time t against that target metric, and n is the number of metrics that build the composite quality measure. An example of the composite quality measure defined in (1) may be:

$$Q(t) = \frac{BER_t}{BER(t)} w_1 + \frac{RSSI(t)}{RSSI_t} w_2 + \quad (2)$$
$$\frac{SIR(t)}{SIR_t} w_3 + \frac{RTD_t}{RTD(t)} w_4 + \frac{EBW(t)}{EBW_t} w_5 + \frac{RTC_t}{RTC(t)} w_6$$

The example composite quality measure shown in (2) is based on BER (bit error rate), RSSI (Received Signal Strength Indication), SIR (Signal to Interference Ratio), RTD (round trip delay), EBW (Effective Bandwidth/Throughput seen by applications), and RTC (Re-Transmit rate). In some embodiments, all of these metrics originate from measurements performed locally by the mobile device. In other embodiments, some measurements are performed locally, and some are reported to the mobile device by the network. As shown, each metric is normalized against its target value (e.g., the value necessary to achieve the target quality of service for all the active applications). Metrics may be weighted as necessary. Composite quality measures may be defined separately for different access technologies. For example, one RSSI value may have a totally different effect for Global System for Communications (GSM) cellular standards than that of WiFi.

In order to further refine the handover decision process, we define a connection feasibility table. An access connection type is added to the feasibility table after it is discovered by the smart scan process (FIG. 3) and its composite quality is better than the target quality or:

$$Q(t) > Q_{target} \quad (3)$$

Where $Q_{target}$ is $$Q_{target} = \sum_{i=1}^{n} w_i \quad (4)$$

Because the weights $w_i$ may be different for different connection types, separate values for $Q_{target}$ may also be maintained for different connection types.

Once a connection is added to the feasibility table, the necessary connection preparation is made to initiate the handover process (such as associate, registration, and authentication). A vertical handover becomes imminent when the composite quality measure of current connection type falls below the target composite quality measure reduced by a hysteresis margin of a valid entry that exists in the feasibility table (or if the connection type in the feasibility table has a higher priority than the current connection) as:

$$Q(t) < Q_{target} - H \quad (5)$$

where H represents the amount of hysteresis.

Figure 2:
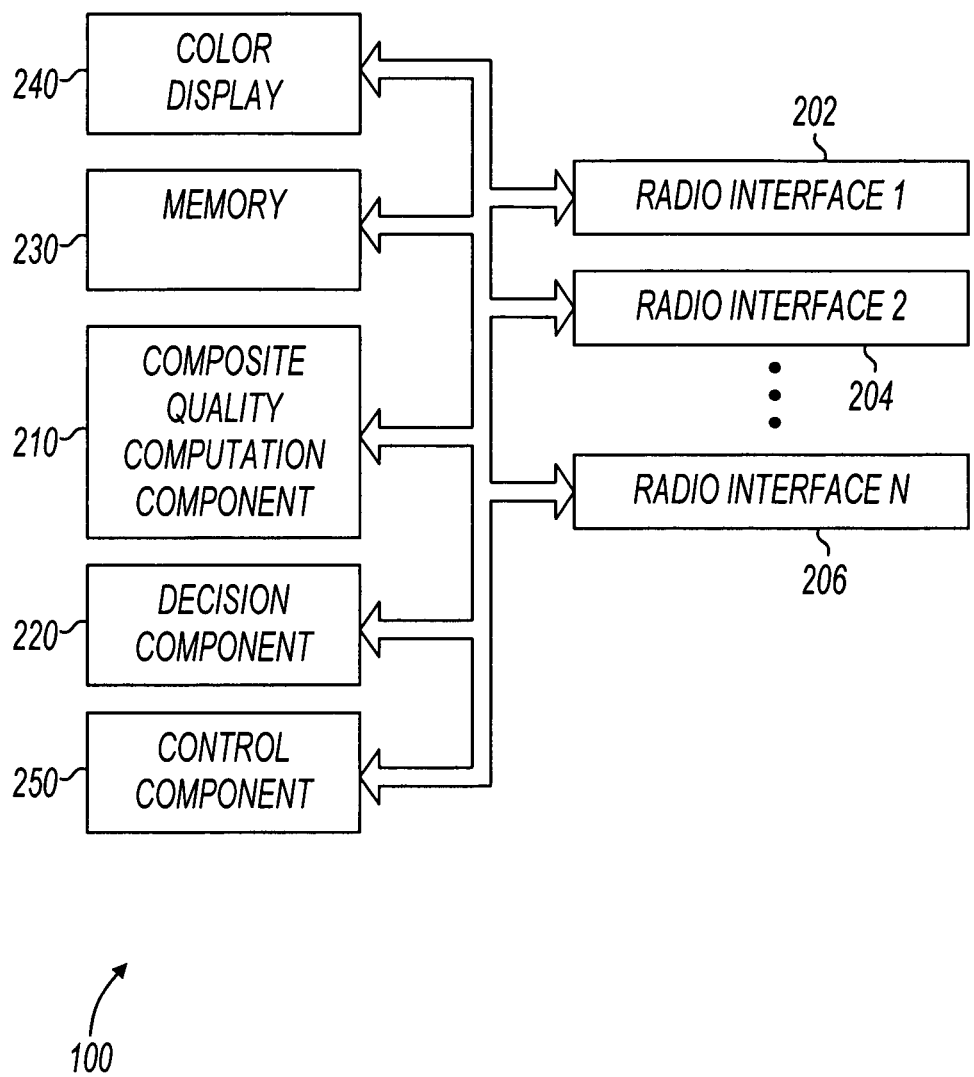
FIG. 2 shows a diagram of a mobile device.

FIG. 2 shows a diagram of a mobile device. Mobile device 100 includes radio interfaces 202, 204, and 206, composite quality computation component 210, decision component 220, memory 230, color display 240, and control component 250. Radio interfaces 202, 204, and 206 represent "N" separated interfaces, and may provide network connections of any type. For example, radio interface 202 may be a cellular interface, radio interface 204 may be a WLAN interface, and radio interface 206 may be a WWAN (WMAN) interface.

The various components shown in FIG. 2 may be implemented using hardware, software, or a combination of hardware and software. For example, control component 250 may be implemented by hardware such as a processor, or may be implemented by software that is executed by a processor. In some embodiments, control component 250 is implemented in a combination of hardware and software. The same is true for composite quality computation component 210 and decision component 220. In some embodiments, mobile device 100 includes a single processor, and each of the components shown in FIG. 2 is realized by software executed by the processor.

Control component 250 provides a general control function for mobile device 100. Control component may scan the radio interfaces, and query each for signal measurement information. The signal measurement information is provided to composite quality computation component 210.

Scanning may occur periodically, and the signal measurement information is retrieved each time. Control component 250 may also interpret composite quality measures, and cause corresponding radio interfaces to prepare for a handover. For example, if a composite quality measure for a particular connection type is above the corresponding target, control component 250 may cause the associated radio interface to establish a link and prepare to seamlessly accept a handover.

Composite quality computation component 210 receives signal measurement information from the various radio interfaces, and computes the composite quality measure shown in eq. (1) for each connection type. In some embodiments, all of the signal measurement information originates from the radio interfaces resident in mobile device 100, and in some embodiments, some signal measurement information originates from the radio interfaces resident in mobile device 100, and some signal measurement information originates from far end devices such as cellular base stations and network access points. Example signal measurement information includes BER, RSSI, SIR, RTD, EBW, and RTC. The composite quality measures may be updated periodically to reflect changing radio conditions over time.

Decision component 220 makes handover decisions based in part on the composite quality measures. For example, if the composite quality measure of the connection currently in use degrades significantly, decision component 220 may decide to handover to a different connection type having a greater composite quality measure. Decision component 220 may also perform additional handover processing to effect a seamless handover. For example, when handing over a voice call, decision component 220 may perform various additional handover procedures (e.g., 3GPP IMS VCC (Voice Call Continuity), 3GPP UMA/GAN (Unlicensed Mobile Access/Generic Access Network), and IETF Mobile IPv4/6).

Memory 230 may include a connection feasibility table. For example, when control component 230 determines that a composite quality measure for a particular radio interface is above a target, that radio interface represents a feasible connection type, and an entry may be made into a connection feasibility table corresponding to that radio interface. The connection feasibility table maintains information corresponding to all currently feasible connections, and is updated periodically as radio conditions change.

Memory 230 also represents an article that includes a machine readable medium. For example, memory 230 represents a random access memory (RAM), dynamic random access memory (DRAM), static random access memory (SRAM), read only memory (ROM), flash memory, or any other type of article that includes a medium readable by a machine such as a processor. Memory 230 may store instructions for performing the execution of the various method embodiments of the present invention. Memory 230 may also store instructions that implement (either wholly or partially) control component 250, composite quality computation component 210, and decision component 220.

Color display 240 provides a visual interface for a user to interact with mobile device 100. For example, mobile device 100 may be a telephone capable of communicating with a cellular base station and/or a WLAN using voice-over-IP (VOIP). Color display 240 provides a display for the phone. In some embodiments, color display 240 is omitted. For example, mobile device 100 may be a "black box" device that provide connectivity for other devices. Examples include, but are not limited to: an add-on card for a computer, and an interface device capable of interfacing to a plain old telephone set (POTS). Also for example, mobile device 100 may include a black and white display. Substantial embodiments exist that include color displays, black and white displays, and no displays.

Figure 3:
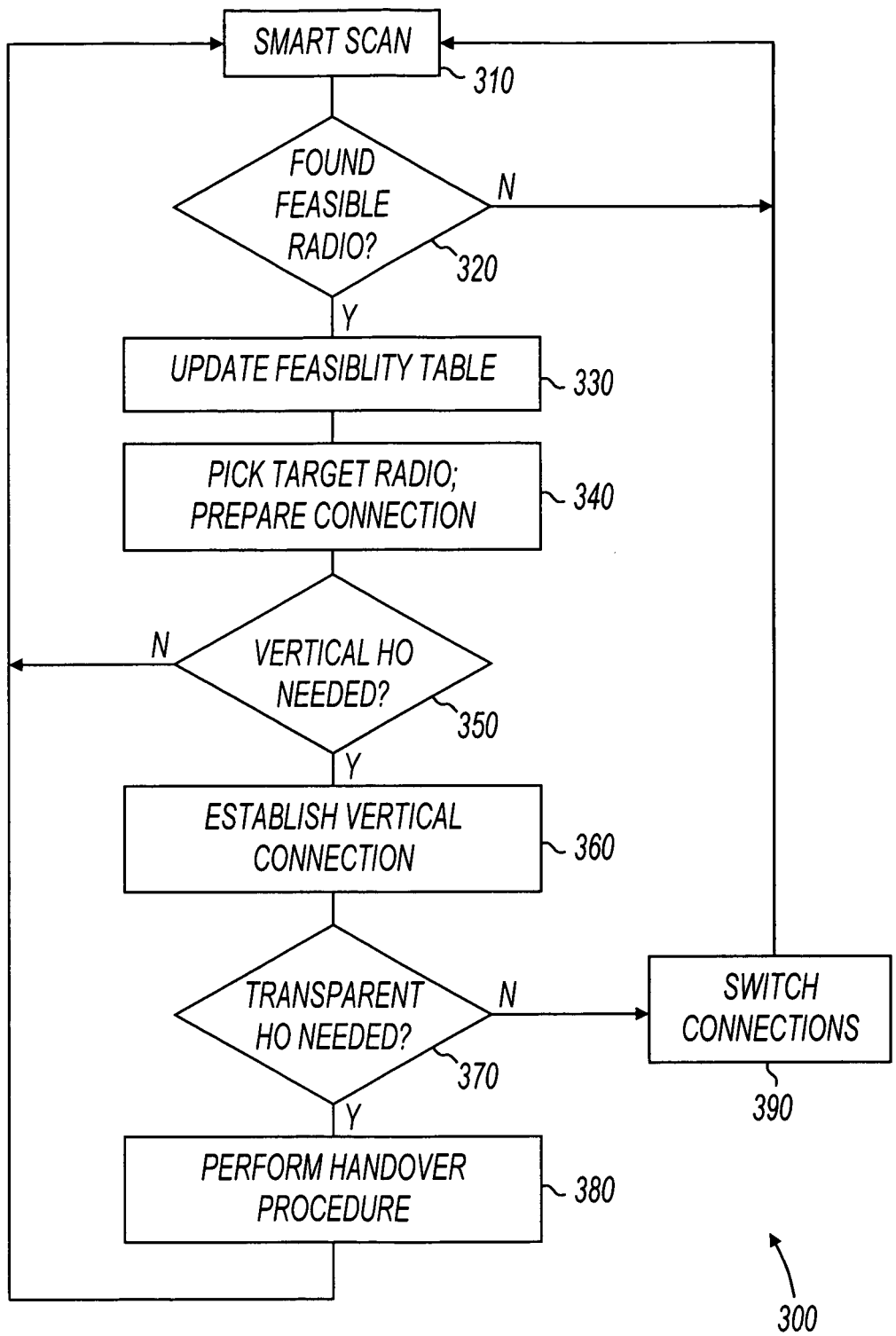
FIG. 3 shows a flowchart in accordance with various embodiments of the present invention.

FIG. 3 shows a flowchart in accordance with various embodiments of the present invention. In some embodiments, method 300 may be used in, or for, a mobile device operating in a heterogeneous network environment. In some embodiments, method 300, or portions thereof, is performed by a combination of components within a mobile device, embodiments of which are shown in the various figures. Also in some embodiments, method 300 is performed by a processor or electronic system. Method 300 is not limited by the particular type of apparatus or software element performing the method. The various actions in method 300 may be performed in the order presented, or may be performed in a different order. Further, in some embodiments, some actions listed in FIG. 3 are omitted from method 300.

Method 300 is shown beginning at block 310 in which a "smart scan" is performed. The smart scan is performed by scanning radio interfaces or connection types, gathering signal measurement information, computing composite quality measures, and comparing those measures against targets. For example, as described above with reference to FIG. 2, a mobile station may collect signal measurements and metrics, and compute a composite quality measure as shown in eq. (1), above. Also for example, the composite quality measures may be compared against a corresponding target as shown in eq. (3), above. When a composite quality measure for a particular radio is above the corresponding target, that radio is referred to as feasible.

At 320, if any feasible radios were found in the smart scan of 310, then the feasibility table is updated at 330. If no feasible radios were found, then method 300 continues again at 310 to perform another smart scan. Updating the feasibility table may involve adding a new table entry to signify that a new connection type is now feasible, or may involve updating an existing entry with a new value for its composite quality measure.

At 340, a target radio is picked, and a connection with that target radio is prepared. The target radio may correspond to a feasibility table entry with the highest composite quality measure. In some embodiments, the connection is prepared prior to making a vertical handover decision, so that the vertical handover, if and when made, may be accomplished with low latency and high reliability. Connection preparation may include operations such as association, registration, authentication, getting IP address and the like.

At 350, method 300 determines whether a vertical handover is needed. A vertical handover becomes necessary when the composite quality measure falls below the target composite reduced by a hysteresis margin and a valid entry exists in the feasibility table (or the connection in the feasibility table has a higher priority than the current connection). This is shown above by eq. (4). If no vertical handover is needed, then method 300 continues again at 310 to perform another smart scan. If a vertical handover is needed, method 300 continues to 360 in which the vertical connection is established.

When a vertical handover is to be performed, method 300 determines if current applications running in the mobile device require transparency to connection changes at 370. For example, if the only active application is a web browser, then changes to underlying IP address would not impact the service. In such cases where the applications are transparent to connection changes, no vertical handover procedure towards the network is required and a simple connection switching would achieve the goal. This is shown at 390. In other cases where the application shows great sensitivity to connection changes (e.g. voice, VPN), vertical handover procedures (e.g. GAN/UMA, VCC, Mobile IP) may be initiated at 380 as part of the handover procedure.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method performed by a mobile device comprising:
   receiving a plurality of measurements corresponding to operation of a first radio interface;
   normalizing each of the plurality of measurements to produce a plurality of normalized measurements;
   weighting each of the plurality of normalized measurements to produce a plurality of weighted normalized measurements;
   summing the plurality of weighted normalized measurements to form a composite quality measure for the first radio interface;
   receiving a second plurality of measurements corresponding to operation of a second radio interface;
   normalizing each of the second plurality of measurements to produce a second plurality of normalized measurements;
   weighting each of the second plurality of normalized measurements to produce a second plurality of weighted normalized measurements; and
   summing the second plurality of weighted normalized measurements to form a composite quality measure for the second radio interface.

2. The method of claim 1 further comprising comparing the composite quality measure against a target quality measure for the first radio interface, and adding the composite quality measure to a feasibility table if the composite quality measure exceeds the target quality measure.

3. The method of claim 1 further comprising comparing the composite quality measure for the second radio interface against a target quality measure for the second radio interface, and adding the composite quality measure for the second radio interface to a feasibility table if the composite quality measure for the second radio interface exceeds the target quality measure for the second radio interface.

4. The method of claim 3 further comprising comparing the composite quality measures for the first and second radio interfaces to determine which radio interface to use for a vertical handover.

5. The method of claim 1 wherein the first radio interface comprises a cellular telephone interface, and the second radio interface comprises a local area network interface.

6. The method of claim 1 further comprising repeating the method for additional radio interfaces within a common apparatus to produce a plurality of composite quality measures.

7. The method of claim 6 further comprising comparing the plurality of composite quality measures to determine which of the plurality of radio interfaces to utilize for a vertical handover.

8. The method of claim 6 wherein the measurements include at least one measurement from the set consisting of: signal strength, bit error rate, effective bandwidth, round trip delay, and re-transmit rate.

9. The method of claim 6 wherein different target quality measures are utilized for each of the plurality of radio interfaces.

10. The method of claim 1 wherein at least one of the measurements is generated by the first radio interface, and at least one of the measurements is received from a far end device communicating with the first radio interface.

11. An article having a machine readable non-transitory medium with instructions stored thereon that when accessed result in a mobile communications device performing the method of claim 1.

* * * * *